(12) United States Patent
Kawashima

(10) Patent No.: US 6,546,601 B1
(45) Date of Patent: Apr. 15, 2003

(54) BUCKLE FOR A PAIR OF SWIMMING GOGGLES

(75) Inventor: Haruo Kawashima, Tokyo (JP)

(73) Assignee: Tabata Co., Ltd., Tokyo (JP)

( * ) Notice: Subject to any disclaimer, the term of this patent is extended or adjusted under 35 U.S.C. 154(b) by 0 days.

(21) Appl. No.: 09/497,624

(22) Filed: Feb. 3, 2000

(30) Foreign Application Priority Data

Feb. 5, 1999 (JP) ............................................ 11-028795

(51) Int. Cl.⁷ ................................................ A44B 11/04
(52) U.S. Cl. ............................ 24/200; 24/197; 24/198; 24/265 BC
(58) Field of Search ............................ 24/265 BC, 198, 24/265 A, 199, 265 AL, 200, 265 EC, 129 R, 129 B, 3.3; 2/428–430, 452; 351/43, 156

(56) References Cited

U.S. PATENT DOCUMENTS

| | | | | |
|---|---|---|---|---|
| 73,242 A | * | 1/1868 | Gerard ........................ 24/198 |
| 336,846 A | * | 2/1886 | Durand ........................ 24/17 R |
| 977,404 A | * | 11/1910 | Humphrey ................. 24/200 X |
| 1,972,933 A | * | 9/1934 | Harrison ...................... 24/200 |
| 4,457,051 A | * | 7/1984 | Bartolini ...................... 24/198 |
| 4,941,434 A | * | 7/1990 | Ellwanger ................... 119/109 |
| 5,661,878 A | * | 9/1997 | Johnson, III ................. 24/200 |
| 5,706,526 A | | 1/1998 | Huang et al. .................. 2/428 |
| 5,706,527 A | * | 1/1998 | Kita et al. ..................... 2/452 |
| 5,711,036 A | * | 1/1998 | Kita et al. ..................... 2/452 |
| 5,799,338 A | * | 9/1998 | Huang ........................... 2/428 |
| 5,802,681 A | * | 9/1998 | Riley et al. ................... 24/326 |
| 5,829,064 A | * | 11/1998 | Huang ........................... 2/428 |
| 5,918,351 A | * | 7/1999 | Chou ...................... 24/265 BC |
| 6,141,835 A | * | 11/2000 | Wilson ..................... 24/200 X |

* cited by examiner

Primary Examiner—J. J. Swann
Assistant Examiner—Ruth C. Rodriguez
(74) Attorney, Agent, or Firm—Butzel Long

(57) ABSTRACT

A buckle provided in the form of a frame comprising first and second side edges opposed to each other in a longitudinal direction of strap recieved by the buckle, first and second ends opposed to each other in a direction orthogonal to the longitudinal direction, and a plurality of partitions arranged between the first and second ends which connect the first and second side edges to each other. The first and second side edges and the first and second ends cooperating with the partitions to define a plurality of strap guiding holes arranged in the longitudinal direction. One of the first and second side edges partially defining a first outermost one of the strap guiding holes lying adjacent the first end. The other of the first and second side edges partially defining a second outermost one of the strap guiding holes lying adjacent the second end. The first and second outer most strap guiding holes being formed with slots each communicating the respective one of the first and second outermost strap guiding holes and having an opening-width dimensioned in the longitudinal direction that is smaller than the width of the strap.

3 Claims, 2 Drawing Sheets

BUCKLE FOR A PAIR OF SWIMMING GOGGLES

BACKGROUND OF THE INVENTION

This invention relates to a buckle adapted to secure a strap of swimming goggles thereto, U.S. Pat. No. 5,706,526 issued to Ann Huang on Jan. 13, 1998 discloses a pair of swimming goggles comprising a main frame body, a pair of elastic straps wound through a pair of slots respectively defined in both sides of the main frame body, a pair of strap clamping blocks each adapted to converge upper and lower sections of each strap and a pair of buckles by which one of the paired straps is secured to the other of the paired straps.

Each of the buckles is attached to a first end of each strap and each of the buckles has a plurality of strap guiding holes defined by opposite side edges extending in parallel to each other in a longitudinal direction of the strap and a plurality of partitions extending so as to connect the side edges to each other. The rearmost strap guiding hole of the buckle is formed with a slot opening in the longitudinal direction of the strap. In order to bring the second end of a strap into engagement with buckle which is attached to one end of the other strap, a length of the strap is adjusted utilizing two strap guiding holes lying inwardly adjacent the outermost strap guiding hole and then the second end of the strap is inserted through the slot into the outermost strap guiding hole.

However, in the case of the buckles disclosed in the U.S. Patent, there is a concern that the straps might slip off from the outermost strap guiding holes through the respective slots and slacken when the straps are pulled relatively to the respective buckles.

SUMMARY OF THE INVENTION

It is an object of the present invention to provide a buckle for swimming goggles which is designed so that once a strap is secured to the buckle it can not easily slip off therefrom.

According to this invention, there is provided a buckle for a pair of swimming goggles provided in the form of a frame comprising first and second side edges opposed to each other in a longitudinal direction of straps used by said goggles, first and second ends opposed to each other in a direction orthogonal to said longitudinal direction, and a plurality of partitions arranged between said first and second ends to connect said first and second side edges to each other, said first and second side edges and said first and second ends cooperating with said partitions to define a plurality of strap guiding holes arranged in said longitudinal direction, wherein:

one of said first and second side edges partially defining the first outermost one of said strap guiding holes lying adjacent said first end and the other of said first and second side edges partially defining the second outermost one of said strap guiding holes lying adjacent said second end are formed with slots each communicating with the associated of said first and second outermost strap guiding holes having a opening-width dimensioned in said longitudinal direction to be smaller than a width of said strap.

According to one embodiment of this invention, each of said slots has said opening-width progressively reduced from the exterior toward the interior of said slot.

According to another embodiment of this invention, said plurality of strap guiding holes include additional strap guiding holes arranged between said first and second outermost strap guiding holes in the form of intermediate strap guiding holes each defining an opening smaller than those of said first and second outermost strap guiding holes.

According to still another preferred embodiment of this invention, said plurality of strap guiding holes include additional strap guiding holes arranged between said first and second outermost strap guiding holes in the form of intermediate strap guiding holes so that openings defined by these intermediate strap guiding holes are dimensioned to be progressively reduced from the strap guiding holes lying inwardly adjacent said first and second outermost strap guiding holes toward the innermost strap guiding holes, respectively.

According to further another -preferred embodiment of this invention, said first and second side edges are inwardly curved so as to form concaves facing each other.

DESCRIPTION OF THE PREFERRED EMBODIMENTS

Figure 1:
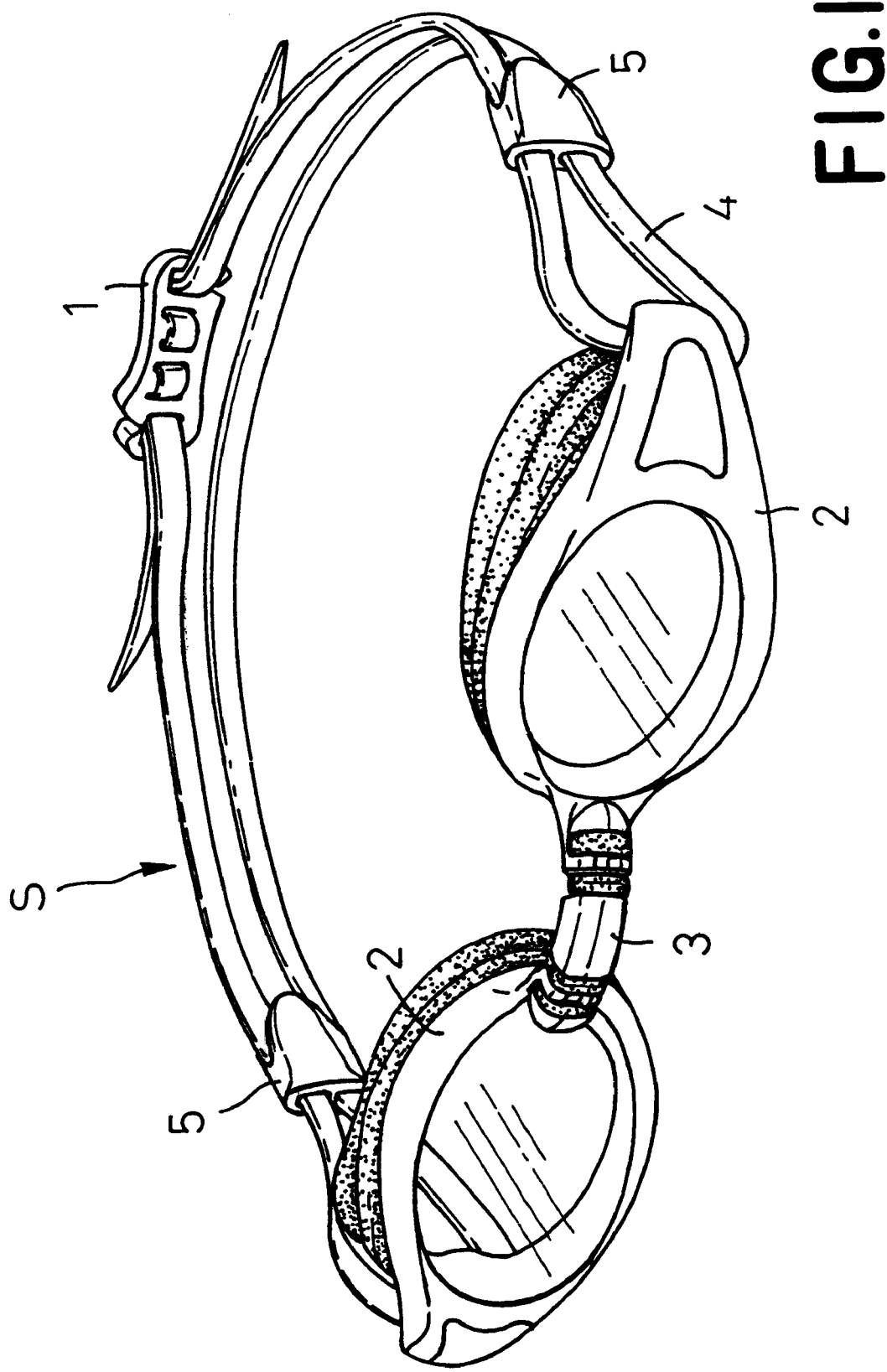
FIG. 1 is a perspective view of a pair of swimming goggles according to this invention.

FIG. 1 is a perspective view of a pair of swimming goggles S which incorporate the use of a buckle according to this invention. The swimming goggles S comprise a pair of lens assemblies 2 interconnected by a bridge 3, an elastic strap 4 extending through a pair of through-holes formed in outer ends of the respective lens assemblies 2 so that the elastic strap 4 defines upper and lower sections thereof, a pair of clamping blocks 5 each adapted to converge the upper and lower sections together and a buckle used to secure longitudinally opposite ends of the strap 4. The ends of the strap 4 are illustrated as being secured in engagement with the buckle.

Figure 2:
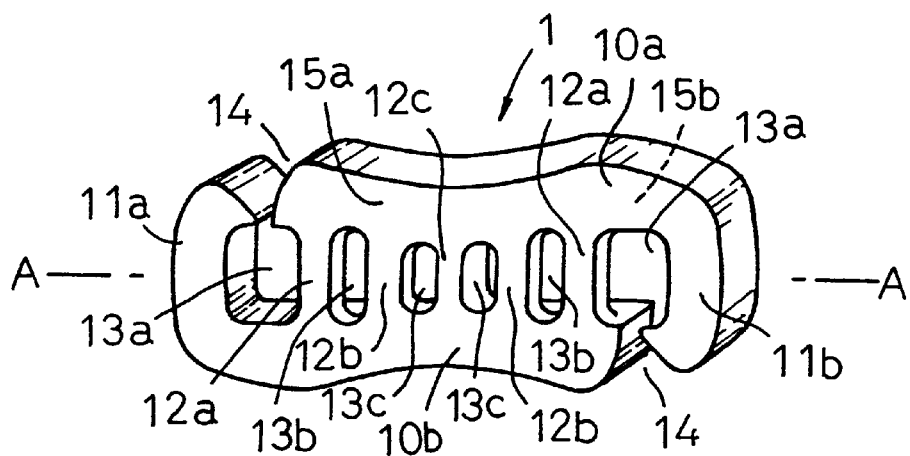
FIG. 2 is a perspective view of a buckle adopted by the swimming goggles shown in FIG. 1.

FIG. 2 is a perspective view of the buckle used in FIG. 1. The buckle is in the form of a frame 1. The frame 1 includes transversely opposite side edges 10a, 10b extending longitudinally of the frame 1 (i.e., longitudinally of the straps 4) with their intermediate portions curved so as to define concaves facing inwardly of the frame 1, longitudinally opposite ends 11a, 11b extending transversely of the frame 1 (i.e., orthogonally to the longitudinal direction of the strap 4), partitions 12a, 12b, 12c arranged between the ends 11a, 11b which connect the side edges 10a, 10b to each other. The frame 1 further includes holes 13a, 13b, 13c defined by the side edges 10a, 10b, the ends 11a, 11b and the partitions 12a, 12b, 12c.

More specifically, the partition 12c connects the side edges 10a, 10b at their middle points and two partitions 12b, 12a are laterally spaced from the partition 12c in opposite directions. Laterally from both sides of the partition 12c, three holes 13c, 13b, 13a are arranged in this order, respectively.

The hole 13b lies inwardly adjacent the outermost hole 13a on each side of the middle partition 12c and defines an opening dimensioned both in length and breadth that is smaller than an opening defined by the hole 13a. The hole 13c inwardly adjacent the hole 13b and an opening dimensioned in length that is smaller than the opening defined by the hole 13b. The hole 13a allows two sections of strap 4 to pass therethrough while the holes 13b, 13c allow only the single section of strap 4 to pass therethrough, respectively.

Friction resistance generated between the inner peripheral surfaces of the pair of innermost holes 13c and the peripheral surface of the strap 4 is higher than friction resistance generated between the inner peripheral surfaces of the respective pairs of holes 13a, 13b and the peripheral surface of the strap 4. Therefore, the strap 4 is reliably retained by the holes 13c against slipping off from the buckle even if the strap 4 is pulled in opposite directions longitudinally thereof so that the strap 4 might slip off through the outermost holes 13a as well as through the holes 13b lying inwardly adjacent the respective holes 13a and the longitudinally opposite ends of the strap 4 might go away from each other.

The side edges 10a, 10b are formed with slots 14, respectively, so that each of the slots 14 communicates with the associated holes 13a. An alternative arrangement is possible without departing the scope of this invention in which only one of the side edges 10a, 10b is formed with the slot 14.

The width of an opening defined by the slot 14 as measured in the longitudinal direction of the side edges 10a, 10b is progressively reduced from the exterior toward the interior of the slot 14. Such unique dimensioning facilitates guiding the strap 4 through the slot 14 into the hole 13a.

The minimum width of the opening defined by the slot 14 is preferably smaller than the width of the strap 4 and more preferably smaller than the thickness of the strap 4. Dimensioning the minimum width of the opening defined by the slot 14 to be smaller than the width as well as the thickness of the strap 4 makes it possible to prevent the strap 4 from slipping off from the slot 14 even if the strap 4 once guided into the hole 13a is turned in any direction.

Each of the slots 14 is formed on the inner surface of the associated hole 13a extending in parallel to the side edges 10a, 10b substantially at the middle thereof. Accordingly, there is no apprehension that the strap 4 might fall off from the slot 14 unless the strap 4 is pulled in the direction substantially orthogonal to the side edges 10a, 10b. The slot 14 formed at the position as has been described above can more reliably retain the strap 4 against unintentionally slipping off from the slot 14 than the slot 14 were formed at a corner of the hole 13a corresponding to the intersecting point of the side edge 10a or 10b and the end 11a or 11b, respectively.

With the unique arrangement such that one of two slots 14 is formed in one side edge 10a of said transversely opposite side edge 10a, 10b and the other of two slots 14 is formed in the other side edge 10b, it is possible to eliminate an apprehension that the longitudinally opposite ends of the strap 4 might slip off from the respective slots 14 at once even if these ends of the strap 4 are pulled upward or downward as viewed in FIG. 2.

Figure 3:
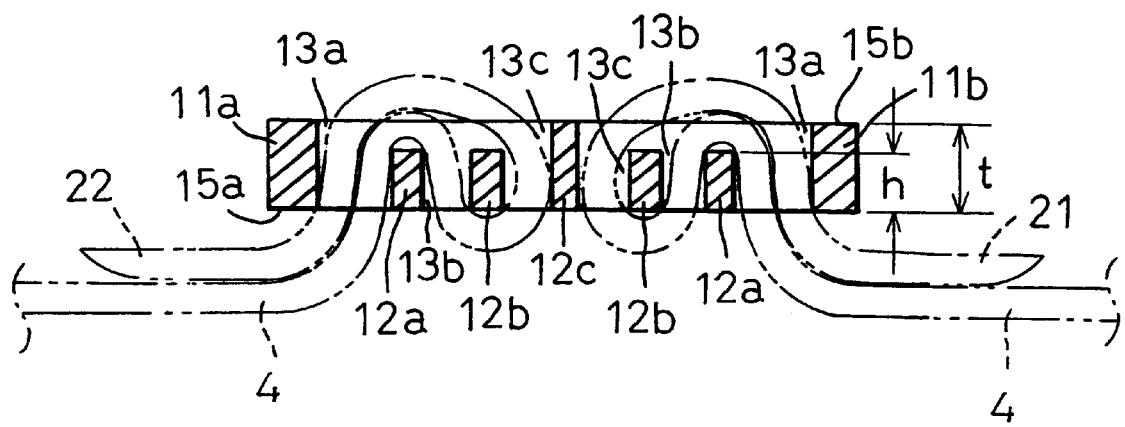
FIG. 3 is a sectional view taken along a line A—A in FIG. 2.

FIG. 3 is a sectional view taken along a line A—A in FIG. 2, in which imaginary lines indicate the strap 4 having been guided through the buckle. The strap 4 is retained by the frame 1 in a sequence as follows: first, the one end 21 of the strap 4 is guided from a front side 15a of the frame 1 through the outermost hole 13a, then from a rear side 15b of the frame 1 through the intermediate hole 13b. Again from the front side 15a of the frame 1, the end 21 is guided through the hole 13c formed adjacent the middle of the frame 1, then folded back toward the outermost hole 13a and guided via the slot 14 into the outermost hole 13a. In this manner, two sections of the strap 4 arm placed one upon another within the hole 13a and a frictional resistance generated between these two sections prevents them from being slackened. The sequence as has been described with respect to the end 21 of the strap 4 is true for the other end 22 of the strap 4.

As illustrated, the partitions 12a, 12b have a height h smaller than a thickness t of the frame 1 and therefore the strap 4 retained on the partitions 12a, 12b do not significantly project from the frame 1.

The frame 1 is formed from an elastically deformable plastic material. With the ends 11a, 11b of the frame 1 held with the goggles wearer's fingers, respectively, the ends 11a, 11b may be pulled in opposite directions so as to move away from each other, therefore, to forcibly widen the opening of the slots 14 and thereby to easily disengage the strap 4 from the respective slots 14.

The buckle according to this invention can reliably retain the strap against slipping off through the slots from the holes communicating the slots, respectively, even if the strap is pulled in opposite directions. This is because the slots are oriented orthogonally to the direction in which the strap is pulled in the course of wearing the goggles.

The side edges of the frame are curved along their intermediate portions so as to form the concaves facing inwardly of the frame. Such configuration of the side edges better facilitates holding the frame with the fingers placed on the side edges, than in the case of the frame having the rectilinear side edges. Then, with the side edges held with the fingers of one hand, operation of adjusting a length of the strap as well as operation of disengaging the strap from the slots may be carried out with the fingers of the other hand.

What is claimed is:

1. A buckle for adjustably securing a strap of a pair if swimming goggles, the buckle comprising:

a frame having first and second side edges opposed to each other in a longitudinal direction that extends along a length of the strap, first and second ends opposed to each other in a direction orthogonal to said longitudinal direction, and a plurality of partitions arranged between said first and second ends that connect said first and second side edges to each other, said partitions defining a plurality of strap guiding holes in the frame that are arranged in said longitudinal direction, said plurality of strap guiding holes including first and second outmost strap guide holes that are adjacent the first and second ends of the frame and at least first and second inner strap guiding holes that are positioned between the first and second outermost strap guiding holes, widths of the first and second outermost strap guiding holes measured in said orthogonal direction being larger than widths of the at least first and second inner strap guiding holes measured in said orthogonal direction, the first and second outermost strap guiding holes being formed at said first and second side edges adjacent said first an second ends with first and second slots that have openings which extend through the first and second side edges which openings are progressively decreasing from outer surface of said first and second side edges toward centers of the first and second outermost strap guiding holes, wherein each of said at least first aid second inner strap guiding holes have openings that are dimensioned to be progressively reduced in size form first and second inner strap guiding holes lying inwardly adjacent said first and second outermost strap guiding holes toward innermost ones to the at least one first and second inner strap guiding holes.

2. A buckle according to claim 1, wherein said first and second side edges are inwardly curved.

3. A buckle according to claim 1, wherein said partitions have a height that is smaller than a thickness of said frame.

* * * * *